US007142856B2

(12) United States Patent
Barrow

(10) Patent No.: US 7,142,856 B2
(45) Date of Patent: Nov. 28, 2006

(54) SYSTEM AND METHOD FOR PROVIDING SUBSCRIBER PRESENCE INFORMATION IN A DISPATCH NETWORK

(75) Inventor: Steven W. Barrow, South Riding, VA (US)

(73) Assignee: Nextel Communications Inc., Overland Park, KS (US)

( * ) Notice: Subject to any disclaimer, the term of this patent is extended or adjusted under 35 U.S.C. 154(b) by 0 days.

(21) Appl. No.: 11/186,040

(22) Filed: Jul. 21, 2005

(65) Prior Publication Data

US 2006/0058025 A1  Mar. 16, 2006

Related U.S. Application Data

(60) Provisional application No. 60/608,914, filed on Sep. 13, 2004.

(51) Int. Cl.
*H04Q 7/20* (2006.01)
(52) U.S. Cl. .............. 455/433; 455/432.1; 455/412.1; 455/412.2; 455/422.1; 455/403; 455/518; 455/519; 709/207; 709/203; 709/201; 709/218; 709/219
(58) Field of Classification Search .............. 455/433, 455/518, 519, 500, 456.1, 456.2, 456.3, 456.4, 455/456.5, 456.6, 414.1, 414.4, 414.2, 435.1, 455/435.2, 435.3, 432.1, 422.1, 403, 466, 455/550.1, 412.1, 412.2, 416; 709/207, 203, 709/201, 218, 219
See application file for complete search history.

(56) References Cited

U.S. PATENT DOCUMENTS

| 6,104,931 | A   | * | 8/2000  | Havinis et al. ........... 455/456.5 |
|-----------|-----|---|---------|--------------------------------------|
| 6,600,928 | B1  | * | 7/2003  | Ahya et al. ................. 455/518 |
| 2005/0107100 | A1 | * | 5/2005 | Gustafsson et al. ......... 455/466 |
| 2005/0227705 | A1 | * | 10/2005 | Rousu et al. ............ 455/456.1 |
| 2006/0031368 | A1 | * | 2/2006 | deCone ...................... 709/207 |

* cited by examiner

*Primary Examiner*—Keith Ferguson

(57) ABSTRACT

A system and method for providing subscriber presence information in a dispatch network is disclosed. In an embodiment of the method, presence subscription information related to a dispatch network subscriber is provided to a home location register. A presence message is provided to a presence server related to the subscription information. A presence status is provided to a party by the presence server. In an embodiment of the system, a home location register stores a subscriber presence table. The presence table includes presence subscription information related to a dispatch network subscriber. A dispatch application processor (DAP) is coupled to the home location register and the DAP retrieves the presence subscription information for a subscriber registered in the DAP. The DAP provides a presence message to the presence server and the presence server provides a presence status to a communications medium.

48 Claims, 3 Drawing Sheets

FIG. 2

SUBSCRIBER PRESENCE TABLE — 200

| Presence Parameter | Condition |
|---|---|
| IMSI | 316010019491430 |
| Dispatch Registration | Y |
| Packet Data Registration | N |
| Mobile IP Registration | N |
| Dispatch Call State | Y |
| Packet Data Call State | Y |
| Dispatch Complex Information | Y |
| Presence Server IP Address | 10.10.10.10 |

210 — IMSI
220 — Dispatch Registration
230 — Packet Data Registration
240 — Mobile IP Registration
250 — Dispatch Call State
260 — Packet Data Call State
270 — Dispatch Complex Information
280 — Presence Server IP Address

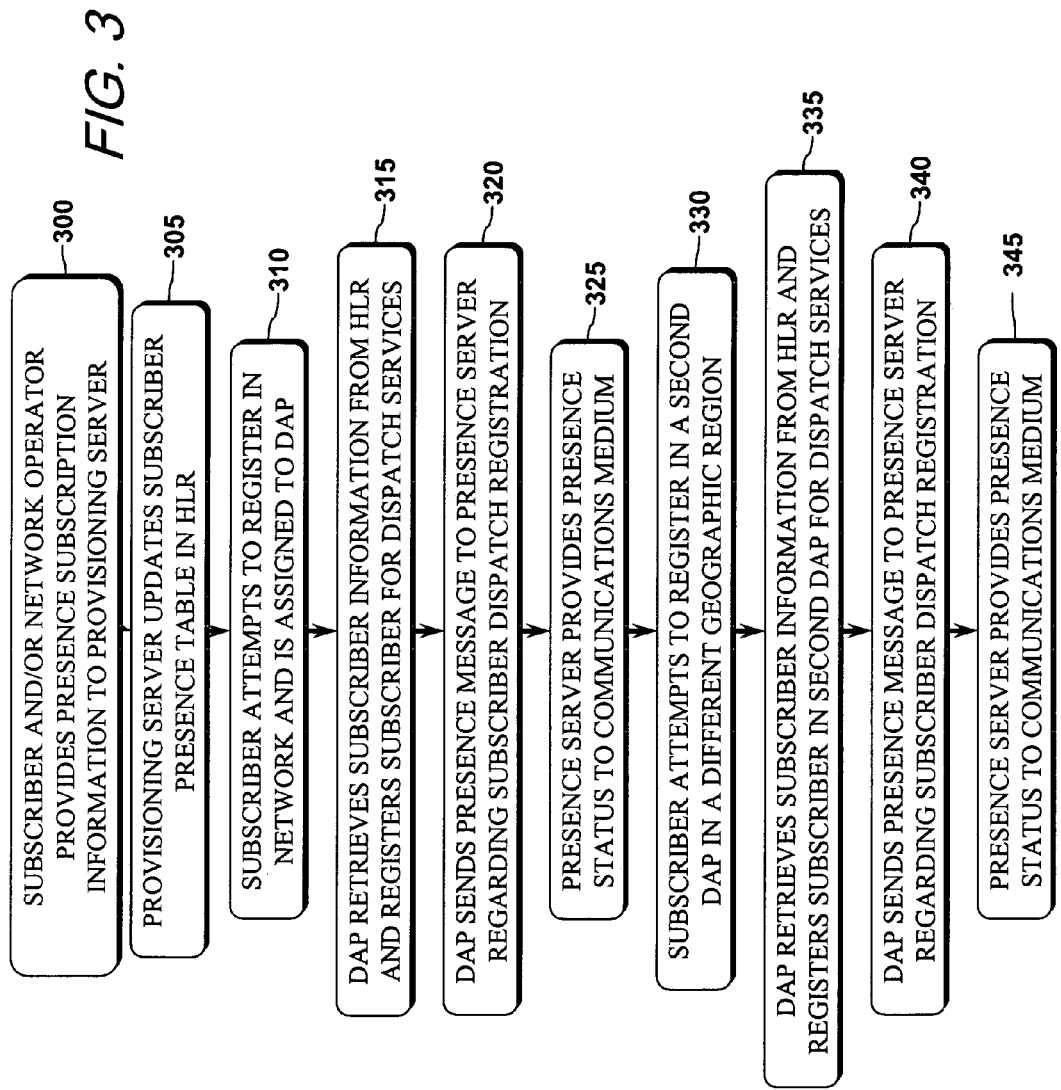

SYSTEM AND METHOD FOR PROVIDING SUBSCRIBER PRESENCE INFORMATION IN A DISPATCH NETWORK

This application claims the benefit of U.S. Provisional Patent Application Ser. No. 60/608,914, filed Sep. 13, 2004, the disclosure of which is herein expressly incorporated by reference.

FIELD OF THE INVENTION

The present invention relates generally to the field of telecommunications, and in particular to presence information for a subscriber to a telecommunications network.

BACKGROUND OF THE INVENTION

Cellular communications systems typically provide interconnect and/or dispatch voice communication services. Interconnect voice communication services are those typically provided by most cellular carriers as circuit-switched communications. Dispatch communication services are commonly known as a "walkie-talkie" type of call, such as provided by Nextel Communications, Inc. and identified by the trade names Push-To-Talk (PTT) or Direct Connect. The popularity of dispatch calls is ever expanding and this increase in popularity has created a demand for more features to be associated with these types of calls.

Currently, presence information regarding individual subscribers to a dispatch network is not determined by the network, and thus, is not available for providing of such information regarding one subscriber to another party that may desire this information. Examples of presence information is whether or not the subscriber is registered in the network, involved in a dispatch call, and involved in a packet data session. As the subscriber base of the telecommunications network increases and as more and more features are requested by the subscribers of the network, it is desirable that this type of information be available for subscribers.

It is desirable to provide presence information of subscribers for any of a variety of reasons. One of these reasons may be that as more people become users of this increasingly popular dispatch service, these new subscribers may be familiar with having such information available in other applications and may expect that this information is made available for dispatch applications. For example, presence information is common in instant messaging applications and is used to inform other users of the status of a particular user, e.g., whether the user is on-line.

Additionally, dispatch communications are also becoming compatible with other communication technologies and applications that include presence information. It may be desirable to provide presence information for/to a dispatch user that is communicating with a party that is using one of these other technologies or applications. For example, a dispatch user on a dispatch network may be communicating with a party on a third party network/application with a presence information capability through an interface and may desire to provide presence information to that party and/or other parties on the third party network/application. This third party network/application may be an internet chatroom, a text messaging session, e.g., short messaging service (SMS), or a voice telephone call either to a handset or a desktop computer.

Therefore, it would be desirable to provide a system and method for providing subscriber presence information for a dispatch network subscriber.

SUMMARY OF THE INVENTION

In accordance with an embodiment of a method of the present invention, a method for providing subscriber presence information in a dispatch network is provided. The method includes providing presence subscription information related to a dispatch network subscriber to a home location register presence table where the subscription information includes a presence parameter. A condition is set for the presence parameter and a presence message is provided to a presence server of the dispatch network related to the presence parameter if the condition for the presence parameter is set as a positive condition. A presence status is provided to a party by the presence server related to the presence message.

In accordance with an embodiment of a system of the present invention, the system includes a home location register including a memory, coupled to the dispatch network. A subscriber presence table is stored within the memory of the home location register and the presence table includes presence subscription information related to a dispatch network subscriber. The subscription information includes a presence parameter. A dispatch application processor (DAP) is coupled to the home location register and the DAP retrieves the presence subscription information from the home location register for a subscriber registered in the DAP. A presence server is coupled to the DAP. The DAP provides a presence message to the presence server related to the presence parameter if a condition for the presence parameter is set as a positive condition and the presence server provides a presence status related to the presence message to a communications medium.

BRIEF DESCRIPTION OF THE DRAWINGS

FIG. 2 illustrates an embodiment of a subscriber presence table of the present invention.

FIG. 3 illustrates an embodiment of a method for providing subscriber presence information in a dispatch network in accordance with the principles of the present invention.

DETAILED DESCRIPTION OF THE EXEMPLARY EMBODIMENTS

Figure 1:
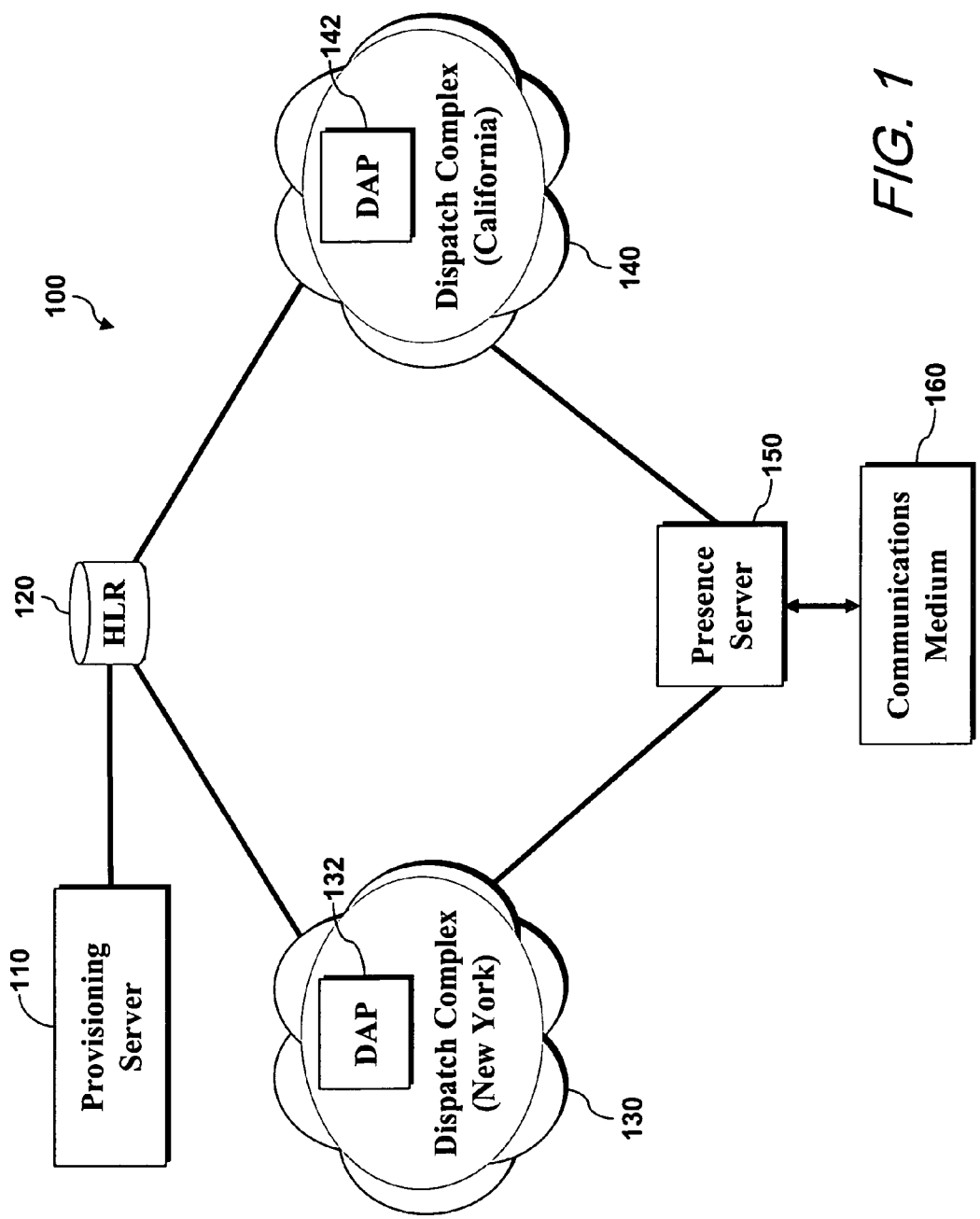
FIG. 1 illustrates an embodiment of a system for providing subscriber presence information in a dispatch network in accordance with the principles of the present invention.

FIG. 1 illustrates an embodiment of an exemplary system 100 for providing subscriber presence information for a mobile subscriber of a wireless dispatch network. A dispatch network is a communications network that provides for dispatch calls between parties. These calls are half-duplex calls and, as discussed previously, are commonly known as "walkie-talkie", or push-to-talk (PTT), types of calls. Such calls are provided by, for example, Nextel Communications, Inc. and the Integrated Digital Enhanced Network (iDEN) that supports these calls. A dispatch network may also provide other services in addition to dispatch voice communications. For example, the dispatch network may also provide for packet data services between parties and internet protocol (IP) services.

As can be seen in FIG. 1, as is known, a provisioning server 110 is coupled to a home location register (HLR) 120 to provide information on a subscriber to the dispatch network. The HLR, among other information, may be used to store information for network subscribers such as last known registered location, communication preferences, and access rights. Additionally, the HLR may contain information related to group and fleet identifications and service provider policies and procedures. Typically, the HLR serves the entire dispatch network or a substantial segment of the network and is a central repository for subscriber and network-related information. As such, the HLR 120 is coupled to dispatch application processors (DAPs) that are located in dispatch complexes in different geographic regions that are served by the network. A DAP, as is known, generally coordinates and controls dispatch, circuit/packet data services, and IP services for subscribers to the network in a geographic region. As illustrated, the HLR 120 can communicate with one or many DAPs, for example, DAP(s) 132 in Dispatch Complex 130, which may serve, for example, the New York region, and DAP(s) 142 in Dispatch Complex 140, which may serve the California region. The present invention is not limited to any particular network configuration and may be utilized with any particularly-named functional components that may be included in a dispatch network.

As will be further described below, in accordance with the principles of the present invention, a presence table containing presence desires related to subscribers of the dispatch network is added in the HLR 120. Provisioning server 110 updates the HLR presence table with a subscriber's presence subscription. A presence server 150 is coupled to the DAPs and receives presence messages from the DAPs related to presence information for the subscriber. The presence server 150 then provides presence status information regarding the subscriber to a communications medium 160, which may or may not be external to network 100, for the information of a third party.

As discussed above and as is illustrated in FIG. 2, in accordance with the principles of the present invention, a subscriber's presence table 200 is added in the HLR. The subscriber's presence table includes fields for presence parameters that are related to various types of presence information for subscribers that may be of interest to a third party and/or the network. These parameters, and their associated fields in the table, could include the mobile subscriber's International Mobile Subscriber Identity (IMSI) 210, a dispatch registration field 220, a packet data registration field 230, a mobile IP registration field 240, a dispatch call state field 250, a packet data call state field 260, a dispatch complex information field 270, and a presence server IP address field 280. The present invention is not limited to these presence parameters for a subscriber and may include any other presence parameters that may be of interest to, for example, the subscribers, the network, third parties, and/or third party applications. For example, the subscriber presence table could also include a push-to-talk or dispatch ID of the subscriber, which in the iDEN system is known as a Universal Fleet Member Identification (UFMI) number.

With respect to these presence parameters, a subscriber to the dispatch network can configure the network with their desires regarding whether presence information regarding these parameters should be made available to another party. As such, each subscriber can provide presence subscription information to the provisioning server to configure the network. This presence subscription information defines which of the presence parameters, and its associated presence status information, can be reported to other parties by setting a condition for each parameter. If the condition is set as positive, the presence information for that parameter will be made available to other parties, and conversely, if the condition is set as negative, the presence information will not be made available. The presence subscription information for that subscriber for each presence parameter is then provided by the provisioning server 110 to the HLR 120 to populate/update the subscriber's presence table in the HLR for that subscriber's particular desires.

Therefore, for each mobile subscriber that allows presence information to be provided, the provisioning server is responsible for populating/updating the HLR's subscriber presence table. As will be further discussed below, the DAP in which a subscriber is registered retrieves the presence subscription information from the HLR for that subscriber. For each presence parameter for the subscriber that is set with a positive condition, the DAP provides a presence message to the presence server regarding the subscriber's status regarding that parameter, e.g., a status as to whether the subscriber is involved in a dispatch call or not presently involved in a call. The presence server then provides a presence status to an interested party regarding the presence parameter.

Further with respect to the above, the following further describes exemplary presence parameters and the conditions that may be set for each. The dispatch registration field 220 in the subscriber presence table 200 is set with a condition which may be either a positive value, e.g., "Y", or negative value, e.g., "N", as desired by the subscriber and as indicated in the subscriber's presence subscription information. If the field contains a "Y" value, as indicated by the subscriber, presence information for the subscriber for this parameter will be made available. For example, whenever the mobile subscriber successfully registers onto the dispatch network the presence server will be updated by the DAP with that event and the presence server will make that status information available to other parties. If the field is set with a "N" value, no presence information for the subscriber will be available for this parameter.

Continuing further, the packet data registration field 230 also contains either a "Y" or "N" value as desired by the subscriber. If the field contains a "Y" value, whenever the mobile subscriber successfully registers onto the packet data portion of the dispatch network the presence server will be updated with that event.

The following further describes the other exemplary presence parameters discussed above. If the mobile IP registration field 240 contains a "Y" value, whenever the mobile subscriber successfully registers for mobile IP service, the presence server will be updated with that event. If the dispatch call state field 250 contains a "Y" value, whenever the mobile subscriber is involved in a dispatch call, whether a private call, a group call, or a dispatch chatroom, the presence server will be updated with that event. Similarly, if the packet data call state field 260 contains a "Y" value, whenever the mobile subscriber is involved in a packet data session, the presence server will be updated with that event. The dispatch complex information field 270 would also contain a "Y" or "N" value. If the field contains a "Y" value, whenever the mobile subscriber has successfully registered in a dispatch complex, the presence server will be updated with dispatch complex information to include the subscriber's registration in the complex and an identification of the dispatch complex.

With respect to the IMSI presence parameter field 210 and presence server IP address field 280, and also the UFMI parameter field, if utilized, these fields in the subscriber presence table may be populated by the network based on subscriber information known by the network. For example, the provisioning server may populate the IMSI field based on information contained in the server. Also, when the subscriber attempts to register in a DAP, the DAP receives from the HLR the IP address of the presence server, which the DAP will use to forward a subscriber's presence information. Whereas the IMSI presence parameter and presence server IP address fields, and others, may be populated by the network, the subscriber may also designate whether he/she desires that this information be made available.

As discussed above and as illustrated in FIG. 1, the presence server 150 provides a presence status to a communications medium 160 for the network subscriber. The present invention is not limited to any particular communications medium. All that is required is that a presence status for a subscriber be determined and available regarding a subscriber. The communications medium may be a device within the dispatch network, e.g., a dispatch network subscriber's telephone handset or computer, or may be a third party device or application that the dispatch network communicates with through an interface, if required. The network subscriber's computer may be a desktop computer that the subscriber is utilizing in a dispatch-to-desktop application. Examples of third party devices and applications where it may be desirable to obtain presence information related to a dispatch network subscriber may be a third party communications network, an internet chatroom, an instant messaging session, or a short messaging service (SMS) session. In order to assist in the ability of the presence server to communicate with third party devices or applications, it may be desirable to provide the presence message to the presence server by the DAP in a standard protocol, e.g., in a session initiation protocol (SIP) format.

Whereas the above description discusses the present invention in terms of "updating" the presence server to reflect an event, it is to be understood that the presence server of the present invention maintains current status information on a subscriber, which may require updating the status information. In accordance with the principles of the present invention, the DAP(s) provides a presence message to the presence server which defines the present status of the subscriber with respect to a presence parameter if the subscriber has set a positive condition for that parameter.

In accordance with the above, the following exemplary method of the present invention is provided. The exemplary method is discussed in the context of a subscriber presence table for mobile subscriber A as illustrated in FIG. 2.

As can be seen in FIG. 2, mobile subscriber A has provided presence subscription information to the provisioning server to configure the subscriber presence table in the HLR. In accordance with this exemplary subscriber presence table, the DAP will send information to the presence server to provide a status as to whether mobile subscriber A is registered in the dispatch network, whether the subscriber is involved in dispatch and packet data sessions, and information related to the dispatch complex in which mobile subscriber A is registered.

An exemplary method for providing subscriber presence information, with reference to the above subscriber presence table, is illustrated in FIG. 3 and is described as follows. In step 300, the subscriber and/or network operator provides presence subscription information to the provisioning server. In step 305, the provisioning server updates the HLR subscriber presence table with the mobile subscriber's desires for presence information as expressed in the subscriber's presence subscription. In step 310, as is known, the mobile subscriber attempts to register in a network dispatch complex for dispatch services and is assigned to a DAP within the dispatch complex.

After assignment to a DAP, in step 315, the DAP retrieves the mobile subscriber's information from the HLR in order to authenticate and register the mobile subscriber in the dispatch complex, and accordingly, in the dispatch network. Included in the information retrieved from the HLR is the mobile subscriber's presence subscription, which is retrieved by the DAP from the HLR's presence table.

When the mobile subscriber has successfully registered in the dispatch network for dispatch services, in step 320 the DAP that serves the mobile subscriber sends a presence message to the presence server to report the subscriber's status regarding the presence parameter of dispatch registration, i.e., the DAP reports that the subscriber is currently registered in the network for dispatch services. As was discussed, the DAP provides a presence message to the presence server for this presence parameter because the subscriber, by their presence subscription information, caused a positive condition to be set for this parameter in the subscriber's presence table. Similarly, the DAP will provide presence messages to the presence server regarding the other presence parameters for which a positive condition has been set. In this example, these other presence parameters with positive conditions are dispatch call state, packet data call state, and dispatch complex information. Accordingly, presence messages will not be sent regarding the presence parameters that have been set with a negative condition. As such, no presence information for the subscriber will be available with respect to these parameters. In step 325, the presence server then provides a presence status to a communications medium regarding the selected presence parameters for the subscriber for visibility by a third party, etc.

As can be seen above, in this example, a subscriber does not need to set a positive condition for one parameter in order to set a positive condition for another parameter. The parameters are mutually exclusive and the subscriber and/or network operator may individually set each parameter's condition depending upon their particular desires. For example, as shown above, the subscriber does not need to set a positive condition for the packet data registration field in order to have presence information available regarding the packet data call state parameter. Even if the subscriber does not want presence information available regarding the subscriber's status regarding registration for packet data services, the subscriber may desire that presence information be available regarding packet data call state, and vice-versa. Similarly, the subscriber may desire that presence information be available for the dispatch registration parameter but not want presence information available for the dispatch call state parameter. In this circumstance, a third party could know that the subscriber is registered in the network for dispatch calls but could not know whether or not the subscriber is actually involved in a dispatch call at any particular time.

The present invention is not limited to only reporting presence information from a single DAP where a subscriber may initially register. Since the subscriber's presence subscription information is maintained in a presence table stored, in an embodiment, in a central HLR for the network, each DAP in the network in which the subscriber may register can access the subscriber's presence subscription information from the HLR presence table. Accordingly, each DAP can provide presence messages to the presence server in accordance with the subscriber's desires.

In continuing with the example above in further discussing the flexibility of the present invention, in step 330, when the mobile subscriber travels to a geographic area serviced by another dispatch complex, e.g., California, and attempts to perform registration in the new dispatch complex, the mobile subscriber is assigned to a second DAP that resides in the second dispatch complex. In accordance with the principles discussed above, the DAP in the new dispatch complex retrieves the mobile subscriber's information from the HLR, including the subscriber's presence subscription information from the presence table, in order to authenticate and register the mobile subscriber, as illustrated in step 335.

When the mobile subscriber has successfully registered for dispatch services, in step 340, the DAP that serves the mobile subscriber in California sends a presence message to the presence server. As discussed above, presence messages will be sent to the presence server for other activities that the mobile subscriber has subscribed to as well. The presence server then again, in step 345, provides a presence status to a communications medium regarding the selected presence parameters for the subscriber for visibility by a third party, etc.

While the above exemplary method describes the second DAP as sending presence messages to the same presence server that is coupled to the first DAP, the present invention is not limited to this architecture. The present invention can include a central presence server or a distributed architecture of multiple presence servers. All that is required is that a presence server receive presence messages from a DAP and provide a presence status related to these messages to a communications medium. Similarly, the HLR is not required to centrally serve all geographic regions. A distributed architecture of HLRs could be utilized in the present invention. All that is required is that an HLR store a presence table for a subscriber and be accessible by a DAP for communication of this information. Additionally, the presence status provided by the presence server is not required to be specifically provided to any one particular third party, network or application. The presence server provides the presence status to a communications medium such that this status is visible to any number of interested parties.

The disclosed embodiments are illustrative of the various ways in which the present invention may be practiced. Other embodiments can be implemented by those skilled in the art without departing from the spirit and scope of the present invention.

What is claimed is:

1. A method for providing subscriber presence information in a dispatch network, the method comprising the acts of:
   storing a subscriber presence table within a memory of a home location register coupled to the dispatch network;
   providing presence subscription information related to a dispatch network subscriber to the home location register subscriber presence table wherein the subscription information includes a presence parameter;
   setting a condition for the presence parameter;
   retrieving the presence subscription information related to the subscriber from the home location register by a dispatch application processor (DAP) coupled to the home location register when the subscriber is registered in the DAP;
   providing a presence message by the DAP to a presence server coupled to the DAP related to the presence parameter if the condition for the presence parameter is set as a positive condition; and
   providing a presence status to a party by the presence server related to the presence message.

2. The method of claim 1 wherein the presence parameter is a dispatch registration field.

3. The method of claim 2 wherein the presence status indicates whether the subscriber is registered onto the dispatch network.

4. The method of claim 1 wherein the presence parameter is a packet data registration field.

5. The method of claim 4 wherein the presence status indicates whether the subscriber is registered onto a packet data portion of the dispatch network.

6. The method of claim 1 wherein the presence parameter is an internet protocol (IP) registration field.

7. The method of claim 6 wherein the presence status indicates whether the subscriber is registered for IP service in the dispatch network.

8. The method of claim 1 wherein the presence parameter is a dispatch call state.

9. The method of claim 8 wherein the presence status indicates whether the subscriber is involved in a dispatch call.

10. The method of claim 1 wherein the presence parameter is a packet data call state.

11. The method of claim 10 wherein the presence status indicates whether the subscriber is involved in a packet data session.

12. The method of claim 1 wherein the presence parameter is a dispatch complex registration field.

13. The method of claim 12 wherein the presence status indicates whether the subscriber is registered in a dispatch complex and, if registered, the presence status identifies the dispatch complex.

14. The method of claim 1 wherein the subscriber presence table includes an IP address of the presence server for a dispatch complex.

15. The method of claim 1 wherein the act of providing a presence status to a party includes the act of providing the presence status to a computer.

16. The method of claim 1 wherein the act of providing a presence status to a party includes the act of providing the presence status to a communications medium that is connected to the dispatch network through an interface.

17. The method of claim 16 wherein the communications medium is an internet chatroom.

18. The method of claim 16 wherein the communications medium is an instant messaging session.

19. The method of claim 16 wherein the communications medium is a short messaging service session.

20. The method of claim 1 further comprising the acts of:
    registering the subscriber in a second dispatch application processor of the dispatch network;
    retrieving the presence subscription information from the home location register by the second dispatch application processor; and
    providing a second presence message to a second presence server of the dispatch network by the second dispatch application processor if the condition for the presence parameter is set as a positive condition.

21. The method of claim 20 further comprising the act of providing a second presence status to the party by the second presence server related to the presence message.

22. The method of claim 20 further comprising the act of providing a second presence status to a second party by the second presence server related to the presence message.

23. The method of claim 20 wherein the first dispatch application processor and the second dispatch application processor each serve a different geographic area of the dispatch network.

24. The method of claim 1 wherein the presence message is provided to the presence server by the dispatch application processor in a session initiation protocol (SIP) format.

25. The method of claim 1 wherein the subscriber presence table includes an International Mobile Subscriber Identity (IMSI) number of the subscriber.

26. The method of claim 1 wherein the subscriber presence table includes a Universal Fleet Member Identification (UFMI) number of the subscriber.

27. A system for providing subscriber presence information in a dispatch network, comprising:
a home location register including a memory coupled to the dispatch network;
a subscriber presence table stored within the memory of the home location register, wherein the presence table includes presence subscription information related to a dispatch network subscriber and wherein the subscription information includes a presence parameter;
a dispatch application processor (DAP) coupled to the home location register, wherein the DAP retrieves the presence subscription information from the home location register for a subscriber registered in the DAP; and
a presence server coupled to the DAP;
wherein the DAP provides a presence message to the presence server related to the presence parameter if a condition for the presence parameter is set as a positive condition and wherein the presence server provides a presence status related to the presence message to a communications medium.

28. The system of claim 27 wherein the communications medium is a computer.

29. The system of claim 27 wherein the communications medium is connected to the dispatch network through an interface.

30. The system of claim 29 wherein the communications medium is an internet chatroom.

31. The system of claim 29 wherein the communications medium is an instant messaging session.

32. The system of claim 29 wherein the communications medium is a short messaging service session.

33. The system of claim 27 wherein the presence parameter is a dispatch registration field.

34. The system of claim 33 wherein the presence status indicates whether the subscriber is registered onto the dispatch network.

35. The system of claim 27 wherein the presence parameter is a packet data registration field.

36. The system of claim 35 wherein the presence status indicates whether the subscriber is registered onto a packet data portion of the dispatch network.

37. The system of claim 27 wherein the presence parameter is an internet protocol (IP) registration field.

38. The system of claim 37 wherein the presence status indicates whether the subscriber is registered for IP service in the dispatch network.

39. The system of claim 27 wherein the presence parameter is a dispatch call state.

40. The system of claim 39 wherein the presence status indicates whether the subscriber is involved in a dispatch call.

41. The system of claim 27 wherein the presence parameter is a packet data call state.

42. The system of claim 41 wherein the presence status indicates whether the subscriber is involved in a packet data session.

43. The system of claim 27 wherein the presence parameter is a dispatch complex registration field.

44. The system of claim 43 wherein the presence status indicates whether the subscriber is registered in a dispatch complex and, if registered, the presence status identifies the dispatch complex.

45. The system of claim 27 wherein the subscriber presence table includes an IP address of the presence server for a dispatch complex.

46. The system of claim 27 wherein the presence message is in a session initiation protocol (SIP) format.

47. The system of claim 27 wherein the subscriber presence table includes an International Mobile Subscriber Identity (JMSI) number of the subscriber.

48. The system of claim 27 wherein the subscriber presence table includes a Universal Fleet Member Identification (UFMI) number of the subscriber.

* * * * *